United States Patent [19]

Gilbert

[11] 4,167,437
[45] Sep. 11, 1979

[54] BOILING WATER EVAPORATOR WITH SHROUDED HEATING TUBE BUNDLE

[75] Inventor: Frederick W. Gilbert, Shreveport, La.

[73] Assignee: Cook Electric Company, Morton Grove, Ill.

[21] Appl. No.: 776,094

[22] Filed: Mar. 9, 1977

Related U.S. Application Data

[63] Continuation of Ser. No. 613,523, Sep. 15, 1975, abandoned, which is a continuation of Ser. No. 276,605, Jul. 31, 1972, abandoned.

[51] Int. Cl.² ............................................. B01D 1/00
[52] U.S. Cl. ............................... 159/28 R; 159/28 C; 202/174; 159/17 C; 159/2 MS
[58] Field of Search .................. 202/173, 174, 197; 159/2 R, 2 K, 17, 18, 19, 20, 28; 122/34, 74–76; 165/108

[56] References Cited

U.S. PATENT DOCUMENTS

| | | | |
|---|---|---|---|
| 2,078,377 | 4/1937 | Fox et al. | 202/174 |
| 2,499,302 | 2/1950 | Emhardt | 159/28 C |
| 3,251,397 | 5/1966 | Lens et al. | 202/174 |
| 3,326,280 | 6/1967 | Bosquain et al. | 202/173 |
| 3,359,182 | 12/1967 | Williamson | 202/197 |

Primary Examiner—Norman Yudkoff
Attorney, Agent, or Firm—Mason, Kolehmainen, Rathburn & Wyss

[57] ABSTRACT

A boiling water evaporator having a horizontally disposed shrouded heating tube bundle partially immersed in a liquid container. Improved heat transfer rate and high vapor release rate are obtained.

7 Claims, 4 Drawing Figures

BOILING WATER EVAPORATOR WITH SHROUDED HEATING TUBE BUNDLE

CROSS REFERENCE TO RELATED APPLICATIONS

The present application is a continuation application of patent application Ser. No. 613,523, filed on Sept. 15, 1975, and now abandoned, which application is in turn a continuation application of patent application Ser. No. 276,605 filed on July 31, 1972 and also now abandoned.

BACKGROUND OF THE INVENTION

In the art of evaporation or distillation, flash evaporators and boiling water evaporators both are well known. Each type of evaporator has its advantages and limitations.

Flash evaporators have to move large quantities of water per pound of vapor created and the heat exchanger design heat transfer rates are in the order of 450–550 Btu/hr/ft$^2$. The vapor release rates obtainable are about two to two and one-half lbs/hr/in$^2$ at 165° F. Conventional boiling water evaporators are subjected to the same heat transfer rate range of 450–475 Btu/hr/ft$^2$ and release rates of the order of one and one-half to two lbs/hr/in$^2$ are obtainable at 165° F. It is common knowledge that conventional boiling water evaporators have a smaller vapor release rate than flash evaporators. Also, boiling water evaporators are subject to foaming, and additives have to be used in a continuous manner to prevent this. Boiling water evaporators also are subject to scaling and fouling of the evaporating surfaces which results in lower efficiency of operation and increased maintenance and increased down time for the apparatus.

A great deal of research effort, time and money have been spent on boiling water evaporators to develop enhanced heat transfer surfaces which have grooves or the like machines or formed therein in an attempt to double the heat transfer rate obtainable. Thus, even though heat transfer rates of 1500 lbs/hr/in$^2$ are obtainable, the cost of heat transfer surface is increased from two to three times, and when suitable fouling allowance is made in the process design, the advantage of higher heat transfer rates are offset completely by the increased cost of the heat transfer surface.

Ideally, the approach would be to find a simple, inexpensive means to increase the heat transfer rates obtainable in a boiling water evaporator and at the same time increase the vapor release rates obtainable. If this could be achieved, boiling water evaporators would be in a more competitive position with respect to flash evaporators.

SUMMARY OF THE INVENTION

Increased heat transfer rates and increased vapor release rates are achieved in boiling water evaporators by providing a liquid container and means for maintaining therein a given level of liquid to be evaporated. Disposed in the liquid within the container is a heating tube bundle having a closely fitting metallic shroud thereabout. A heating fluid is passed through the interior the tubes of the bundle. Apertures of proportioned size in the bottom of the shroud permit liquid from the container to flow into the shrouded tube bundle. In the top of the shroud, immediately above the tube bundle, is an opening and exit nozzle means to pass a high velocity vapor and liquid stream that is generated within the shrouded tube bundle.

A fluid impenetrable hood is disposed in spaced relationship above the exit nozzle and deflects outwardly and downwardly the two phase stream that is directed against it from the exit nozzle.

At the beginning of the operation of the apparatus, the liquid level within the shrouded tube bundle is the same as the liquid level in the container. In this condition a major portion, but not all, of the tube bundle may be immersed in the liquid. The tube bundle heats the liquid in contact with the outer surfaces thereof and a vapor stream rises through the unimmersed portion of the bundle, is discharged through the exit nozzle, is deflected from the hood, and is passed to condensing means, if desired. Further heating produces violent boiling of liquid about the shrouded tube bundle, and by reason of the shroud disposed closely about the bundle and because of the exit nozzle, a high velocity two phase vapor and liquid stream rises up through the unimmersed tubes of the bundle which further heats the stream. The high velocity and violent boiling causes an uncommonly large amount of water to be included in the stream. This stream is directed by the shroud over all the unimmersed tubes of the bundle to abundantly wet them and thus minimize scaling on the outer surfaces of the tubes.

The liquid level within the shrouded tube bundle falls to a predetermined level below the liquid level outside the tube. Liquid from the container is admitted through the apertures in the bottom of the shroud to maintain the predetermined level inside the shroud during stable operating conditions. The lower level of liquid within the shroud exposes more tubes of the bundle which further heat the two phase stream passing therethrough, thus providing the high heat transfer rate from the tube bundle.

The transversely directed high velocity two phase stream deflected from the hood produces a primary separation of the liquid and vapor, thereby accomplishing an increased vapor separation.

Liquid separated from the stream returns to the liquid in the container. The difference in hydrostatic heads between the liquid outside of the shroud and within the shrouded tube bundle provides a driving force to create continuous circulation of liquid from the container into the shrouded tube bundle. This driving force eliminates the need for pumps.

The rate of producing vapor, and thus distillate, is extremely high for apparatus of given heat transfer surface and given heat input. This is in addition to the advantageous feature that scaling on the outer surfaces of the heater tubes is virtually eliminated.

DESCRIPTION OF PREFERRED EMBODIMENTS

Figure 1:
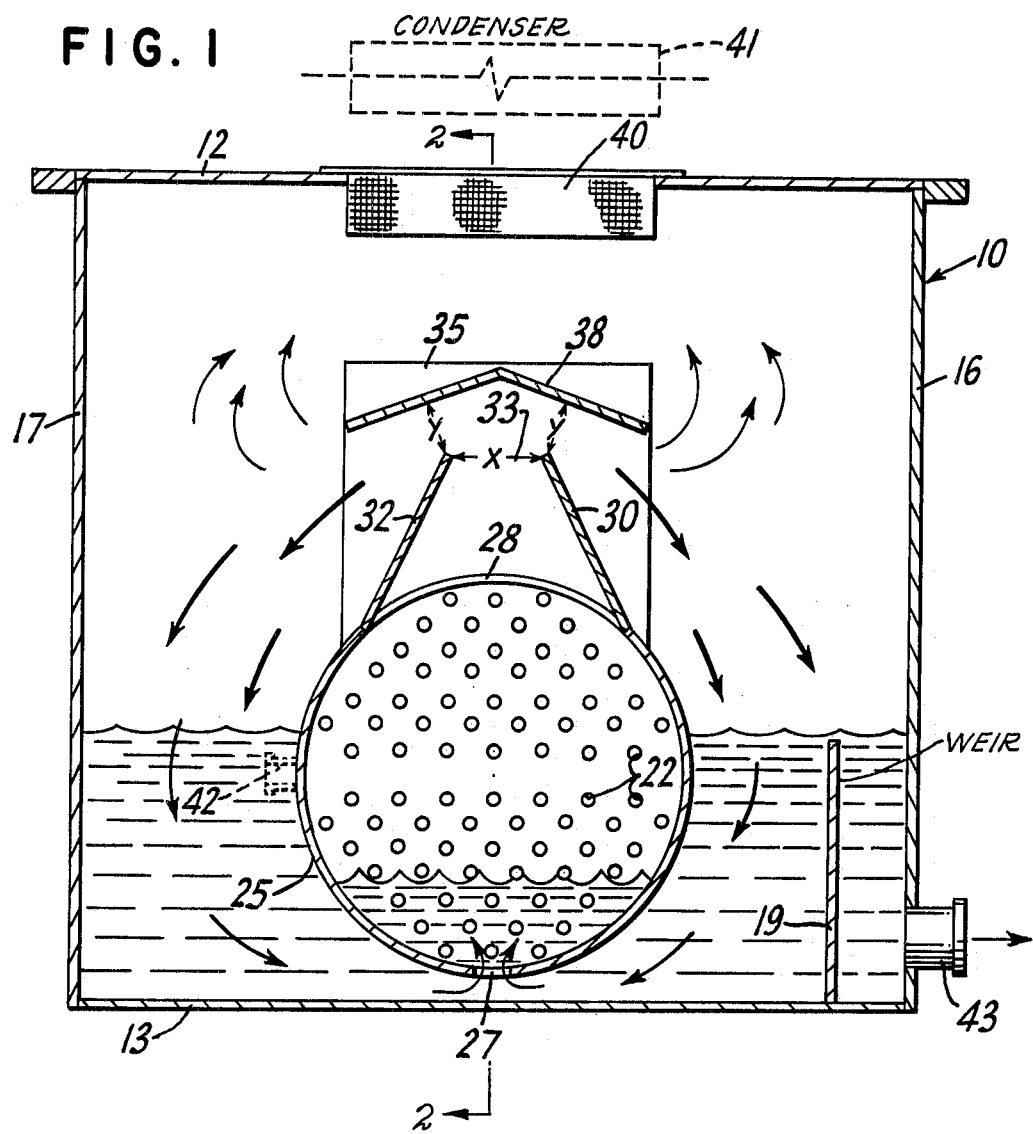
FIGS. 1 and 2 are simplified front and side sectional views, respectively of boiling water evaporating apparatus constructed in accordance with the principles of this invention.
Figure 2:
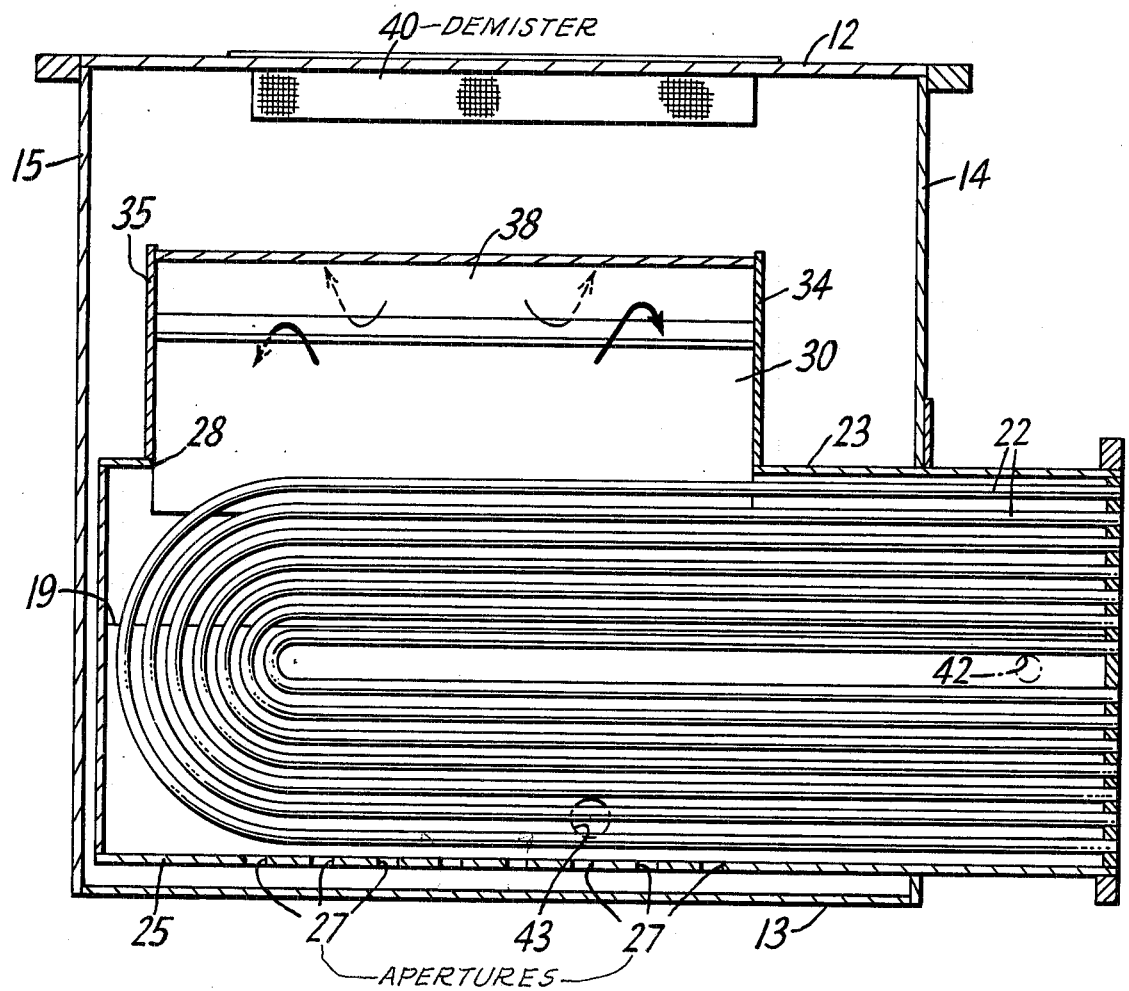

FIGS. 1 and 2 illustrate in simplified form one chamber, or one effect, of a boiling water evaporator that may be included in a sea water evaporator, for example. The chamber includes top and bottom walls 12 and 13, front and back walls 14 and 15, and side walls 16 and 17. A weir 19, FIG. 1, is secured to bottom wall 13 to establish in the bottom portion of chamber 10 the desired level of the liquid to be evaporated. A bundle of heater tubes 22 extends lengthwise through the bottom portion of chamber 10. As illustrated in FIG. 2, heater tubes 22 may be U-tubes whose open ends are at the opening of a cylindrical port section 23. Suitable means are connected to the right end of port section 23 to pass heating fluid through the interior of the U-tubes.

Disposed closely about the bundle of heater tubes 22 is a cylindrical metal shroud 25 which is closed at its back end and which is welded in butting relationship to port section 23. Shroud 25 has a series of aperture 27 through its bottom portion to permit liquid to be evaporated to pass therethrough at a controlled rate, as will be explained below. A longitudinally extending opening 28 is centrally disposed in the top wall of shroud 25 and has a circumferential extent which may range from approximately 60° to 120°. A pair of flat metal sheets 30 and 32 are welded to the longitudinally extending edges of the top opening 28 in shroud 25. Sheets 30 and 32 are inclined inwardly to form an exit nozzle portion 33 of shroud 25. The ends of sheets 30 and 32 are welded to respective end support members 34 and 35 whose bottom ends are secured to the top cylindrical portion of shroud 25.

Disposed directly above exit nozzle portion 33 is a hood 38 of angled or curved sheet metal. A mesh screen demister 40 is located in the top wall 12 of chamber 10. The vapor passing through demister 40 then may pass through a condenser 41, if desired.

Input liquid to be evaporated, such as sea water or brine, is admitted to the interior of shroud 25 through an input port 42, and more concentrated liquid is passed out of chamber 10 through port 43, FIG. 1.

In operation, liquid to be evaporated is introduced through port 42 at a given rate to fill chamber 10 to the level fixed by overflow weir 19. A heating fluid such as steam is passed through the interior of the horizontally disposed heater tubes 22 to raise the temperature of the liquid to its boiling point. Initially the liquid level within shroud 25 is the same as that outside the shroud. As will be explained below, the liquid level within shroud 25 will change as operating conditions are reached.

As the liquid in contact with heating tubes 22 reaches its boiling temperature, vapor rises upwardly through the tube bundle and passes through opening 28 in shroud 25 and through exit nozzle 33. The exiting vapor passes around hood 38 and is drawn through demister 40. Conventional condensing apparatus 41 disposed above or adjacent demister 40 then will condense the vapor, if so desired.

The heat capacity and heat transfer rate of heating tubes 22 are chosen so that as heating continues the boiling action becomes vigorous and the vapor passing through the tube bundle attains a high velocity so that the vapor stream carries along with it an uncommonly large amount of entrained liquid for a boiling water evaporator. This violent boiling action causes the liquid level within shroud 25 and around the tube bundle to fall to a level as illustrated in FIG. 2 wherein the level is approximately one-quarter to one-third the heights of the shroud. This leaves only a minor portion of the tube bundle immersed in the liquid. As liquid within shroud 25 evaporates and the two phase stream rises through the tube bundle, liquid from the bottom of chamber 10 will flow at a controlled rate through apertures 27 in the bottom of shroud 25 to maintain the liquid level therein at the level represented in FIG. 1. It thus may be seen that there is a continuous circulation of liquid upwardly in the two phase stream through the shrouded tube bundle, downwardly from hood 38 to the body of liquid in chamber 10, and from the body of liquid in chamber 10 through apertures 27 back to the interior of shroud 25.

I have found that with the apparatus of this invention considerably more liquid can be made to pass upwardly in the two phase stream through the tube bundle, as compared to prior art apparatus wherein the stream passes upwardly through the interior of heat exchange tubes. As is known, this prior art apparatus is subject to the formation of scale on the interior of the tubes.

The total area of apertures 27 in the bottom of shroud 25 are proportioned with respect to the internal volume of the shroud, the infeed flow rate, the rate at which the two phase stream is generated, and the hydrostatic head of liquid in chamber 10 to achieve the desired differential liquid level outside of and within shroud 25.

At least two significant and interrelated results are achieved from the action described above. First, because shroud 25 is disposed closely about the tube bundle and directs the high velocity two phase stream into intimate contact with the entire bundle, and because of the uncommonly large amount of liquid in the stream, there is a continuous and abundant wetting of the exterior surfaces of all tubes of the bundle. This action virtually eliminates scaling and fouling of the exterior surfaces of the tubes, thereby optimizing heat transfer and minimizing down time required to clean scale from the heat transfer surfaces. Secondly, because the liquid level within shroud 25 falls to about one-quarter to one-third the height of the tube bundle, a major portion of the tube bundle is unimmersed and the rising two phase stream passes over those heater tubes in efficient heat transfer relationship and with a minimal loss of heat transfer due to the normal hydrostatic head loss associated with conventional boiling apparatus. This action results in the increased heat transfer rate from heater tubes 22 and produces the very high velocity vapor-liquid stream.

The two phase mixture of vapor and entrained liquid passes through exit nozzle 33 and impinges against impenetrable hood 38. The mixture then is deflected outwardly and downwardly in jet-like fashion through the openings formed by the top edges of sheets 30 and 32 and hood 38. A primary separation then occurs between the vapor and entrained liquid. The vapor and some entrained liquid rise upwardly around both sides of the hood and pass through demister 40 where a further separation takes place. A major portion of the liquid in the deflected stream from hood 38 is directed against the sides of chamber 10 and onto the top surface of the liquid outside of shroud 25.

The increased heating discussed above and the primary separation obtained from the two phase mixture leaving the region of exiting nozzle 33 and hood 38 results in a vapor release rate which is from two to three times that which is achieved in conventional fully immersed boiling water evaporators or spray film evaporators. As an example, in the operation of boiling water evaporators incorporating the present invention, I have obtained a superficial vapor velocity at the exit plane of nozzle 33 which ranged from approximately 70 to 130 feet per second. The two phase stream of vapor and liquid was estimated to be generated at a rate of from approximately 200,000 to 300,000 pounds per hour of liquid for each 1,000 pounds per hour of vapor.

The driving force for sustaining the thermal circulation of liquid and the high velocity two phase flow through the shrouded tube bundle is the difference in hydrostatic heads between the liquid level outside and inside shroud 25. This force is used to calculate the number and sizes of apertures 27 for a desired recirculation flow rate. It will be understood that apertures 27 may be replaced by a slot or other type of opening having equivalent area.

With the self-sustaining thermal circulation of liquid obtained, no pumps are required to produce the desired circulation. Indeed, the circulation rate obtained in apparatus constructed and operated as described above was of the order of three times that which could be achieved by using a commercially available pump as the driving force for the circulating liquid.

In designing and positioning the exit nozzle 33 and hood 38, the following empirical equation may be used as a guide $$2y = 1.25x$$

wherein the dimension x is the distance across the exit nozzle 33 and y is the distance from the top edge of each of the sheets 30 and 32 to the nearest point on hood 38. In a typical case, hood 38 might have an included angle of approximately 140° between its two sides.

Figure 3:
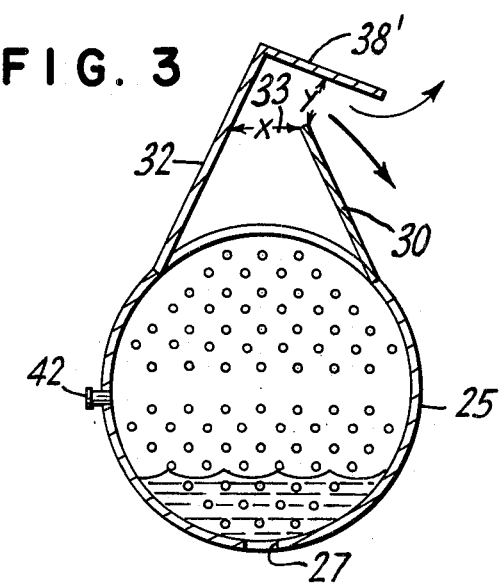
FIG. 3 is a simplified illustration of an alternative embodiment of the present invention.

In some instances it may be desired to discharge the jet-like two phase stream of vapor and entrained liquid from only one side of a hood rather than from both sides as illustrated in FIG. 1. Such an arrangement is illustrated in simplified form in FIG. 3 wherein it is seen that hood 38′ is continuous with the flat sheet 32 that forms exit nozzle 33. In this instance the two phase stream will exit only to the right side between the top edge of sheet 30 and hood 38′. In an arrangement as illustrated in FIG. 3 the design empirical equation relating the dimensions x and y would be $$y = 1.25x$$

As mentioned, the apparatus illustrated in FIGS. 1 and 2 may be a single stage boiling water evaporator or may be one stage or chamber of a multi effect evaporator having successive stages at progressively lower temperatures and pressures. In such apparatus, input port 42 would be connected to receive the output brine from the next higher temperature stage, or the heated infeed, and output port 43 would be connected to the input of the next lower temperature stage. The vapor produced in one stage would be piped to the tube bundle of the next stage to serve as the heating fluid for that next stage. Appropriate chemical treatment apparatus, if required, would be included. Additionally, the apparatus illustrated in FIG. 1 may be but one stage of multiple distillation apparatus wherein the distillate from condenser 41, for example, is piped as the infeed to the next identical evaporator unit. Because the present invention may be incorporated into known types of multi stage systems, further explanation is believed unnecessary.

Figure 4:
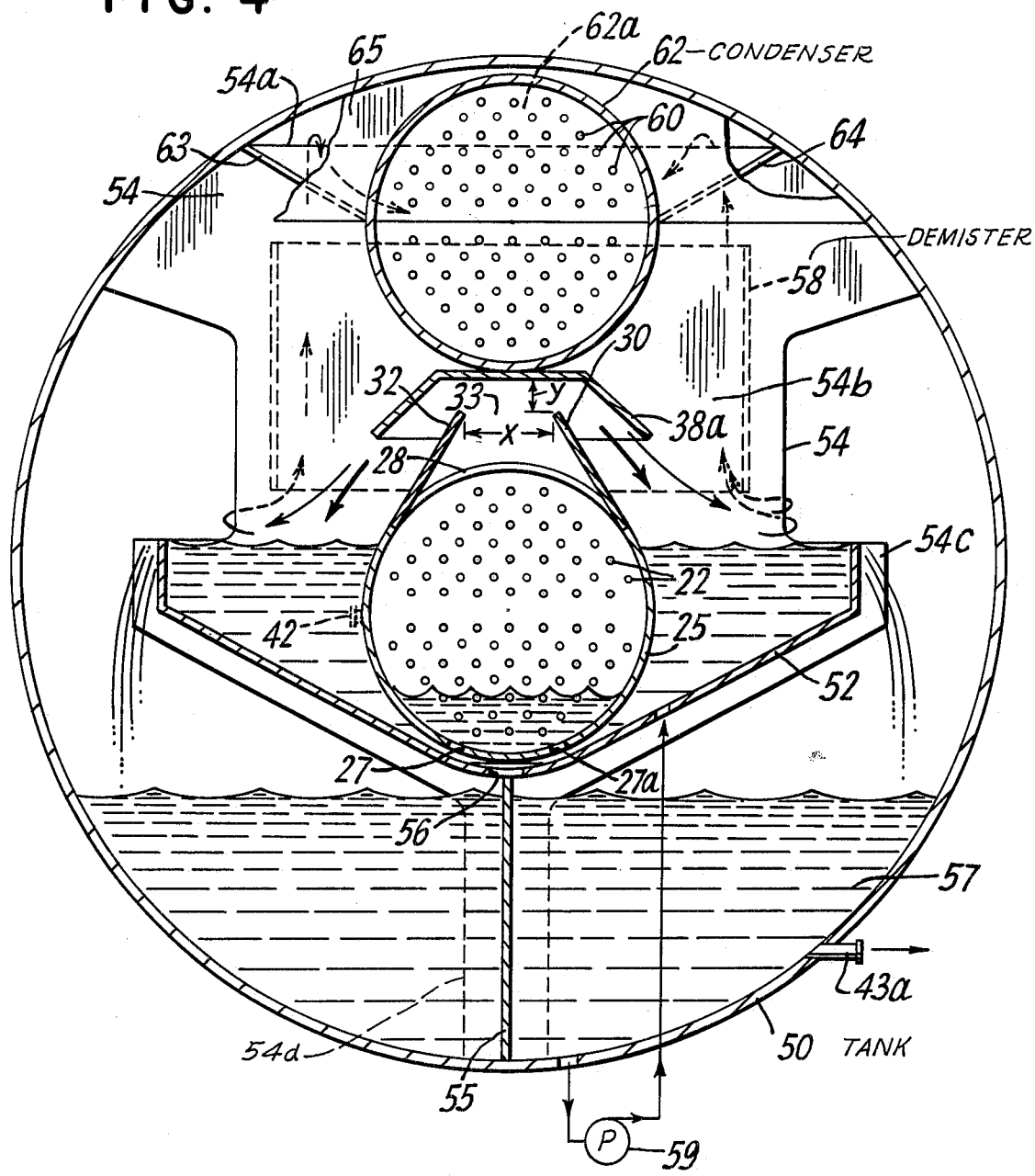
FIG. 4 is a simplified illustration of an embodiment of this invention particularly adapted for use in treating radioactive liquid.

The principles of this invention also may be employed in evaporating-concentrating apparatus for producing condensate and distillate for reuse as the liquid moderator in a pressurized water nuclear reactor system, or to concentrate discharge waste liquid from a nuclear reactor facility. Apparatus of this type is illustrated in FIG. 4. Substantially all of the major components of the evaporator-concentrator are housed within an elongated metallic cylindrical shell or tank 50. An elongated, open top, liquid containing trough or tray 52 extends along the front and mid portions of tank 50 and terminates at end plate 54 which is disposed inwardly from the far end of the tank, that is, the end in the direction into the paper as viewed in FIG. 4. Tray 52 is supported by one or more vertically extending support plates 55. Tank 50 serves not only as the housing for the apparatus but also as a storage reservoir to store throughout the entire length of its bottom portion a quantity of liquid 57 which is to be evaporated and concentrated.

Disposed within liquid container or tray 52 is a shrouded heating tube bundle substantially identical in construction and operation to the corresponding apparatus illustrated in FIGS. 1 and 2. The same reference numerals are used in FIG. 4 as in FIGS. 1 and 2 to designate corresponding apparatus. In FIG. 4, hood 38a is in the form of an elongated truncated prism rather than being sharply peaked as in the previously described embodiment.

Before operation of the evaporator commences, input liquid to be evaporated is introduced into shroud 25 through input port 42 which is located near the front end of shroud 25. The input liquid passes through apertures 27 and 27a in the bottom of shroud 25 and enters tray 25 to fill the tray to overflowing. The spillover from tray 52 falls to the reservoir at the bottom of tank 50. A relatively small aperture 56 in the bottom of tray 52 drains some of the input liquid directly into the storage reservoir in the bottom portion of tank 50. The size of aperture 56 in the bottom of tray 52 is chosen so that in operation the rate of flow therethrough is considerably less than the rate of flow of input liquid through input port 42.

Liquid from the storage reservoir at the bottom of tank 50 is continuously pumped by pump 59 into tray 52 to aid in filling it to overflowing, thus accomplishing a constant mixing of the liquid, as will be explained. Concentrated liquid may be withdrawn from tank 50 through output port 43.

The previously mentioned end plate 54 terminates at its top along a straight edge 54a and is secured as by welding at its two upper side edges to tank 50. Flat plates 30 and 32 which form exit nozzle 33 and hood 38a are secured as by welding to the mid portion 54b of end plate 54. A wide portion 54c of the end plate forms the end of tray 52 and the end of shroud 25. The narrow bottom of portion 54d of the end plate is welded to the bottom of tank 50 and serves as the supporting column for end plate 54.

At the front end of tank 50 a plate similarly shaped to portions 54b, 54c, and 54d of end plate 54 will serve as the other end plate of the boiling water evaporating apparatus.

Supported on the back side of the top portion 54b of end plate 54 is a demister 58 which functions to separate vapor from liquid droplets entrained therein. Demister 58 may include a separator-scrubber device of the type described in U.S. Pat. No. 3,699,007, by Picek et al. This device utilizes substantially pure water distillate as a reflux in the separator-scrubber to dissolve therein a boron vapor constituent of a rising vapor stream. This dissolved boron component then is passed off in overflow liquid, and water vapor continues upwardly through the separator to be condensed in the condenser of the system. The overflow liquid may be returned to the reservoir in the bottom of tank 50.

A condensing tube bundle 60 and enclosing shell 62 are disposed above hood 38a. The back end of shell 62 is welded to end plate 54. Inclined plates 63 and 64, in connection with arcuately fitted vertical top plate 65 about shell 62 and the upper portion of end plate 54 form the vapor entrance duct 62a at the rear of tube shell 62 in its cylindrical side wall to receive vapor from demister 58. Plate 65 is disposed somewhat forwardly of end plate 54 and is welded to the top inner wall of tank 50 and across a top segment of shell 62, and is welded to inclined plates 63 and 64, thus forming the vapor entrance space 62a at the rear of tube shell 62. It thus may be seen that vapor duct 62a is located at the top rear cylindrical portion of shell 62, extending longitudinally between plates 54 and 62 and directly thereabove, and being bounded on its lower edge by the inclined plates 63 and 64.

Vapor entering shell 62 comes into contact with condensing tube bundle 60 and falls as condensate to the bottom of shell 62 where it is collected and/or drained off by conventional means not illustrated, and/or partially recirculated as a reflux in a separator-scrubber as mentioned above.

In the start-up of operation of the apparatus of FIG. 4, liquid to be concentrated, which may be waste liquid to be disposed of or moderator liquid such as a boric acid solution, is introduced into shroud 25 through input port 42. The input liquid may be a continuous infeed or may be a batch of given quantity. Some of the input liquid drains through apertures 27 and 27a in the bottom of shroud 25 and commences to fill tray 52. This process continues until tray 52 fills to overflowing and the liquid falls to the bottom of tank 50 to provide the reservoir 57 of liquid therein. The small pump 59 is actuated to circulate liquid from the reservoir back into tray 52 to maintain a continuous circulation and continuous mixing of the liquids in the tray and in the reservoir. It is obvious that for a continuous infeed through input port 42, the rate of infeed, which equals the evaporation rate plus the concentrate discharge rate, together with the circulation rate of pump 59 will be proportioned to establish and maintain desired liquid levels within the apparatus for given evaporation rates. For batch operation where there will not be a continuous concentrate discharge. Therefore, the infeed through input port 42 is equal to the evaporation rate alone, and pump 59 will establish the desired circulation rate from the reservoir to liquid containing tray 52. In one operating evaporator constructed as illustrated in FIG. 4, the infeed rate through input port 42 was 23 gallons per minute, the flow rate through apertures 27 and 27a was 4,500 gallons per minute, and pump 59 provided a flow rate of 100 gallons per minute.

During the start-up period of the apparatus of FIG. 4, the liquid level within shroud 25 and around the tube bundle will be the same as inside tray 52. As the liquid in contact with the tube bundle reaches evaporating temperature the process described in connection with the apparatus of FIGS. 1 and 2 commences and a high velocity two phase vapor-liquid stream is generated within shroud 25 and passes out through nozzle 33 and is deflected transversely outwardly in jet-like fashion by hood 38a. Primary separation of the vapor and liquid occurs in the deflected stream with a major portion of the liquid being directed as a high velocity stream onto the surface of the liquid in tray 52.

As previously explained, when stable operating conditions are reached the liquid level within shroud 25 and around the heater tube bundle falls to a level approximately one-fourth to one-third the height of the tube bundle so as to establish the differential hydrostatic head that given rise to the self-sustained thermal circulation of liquid from tray 52 into and through shroud 25.

The vapor portion of the transversely deflected two phase stream from hood 38a, together with some entrained liquid, is drawn around the sides of the portion 54b of end plate 54 and travels behind the end plate to the rear of tank 50, i.e., in the direction into the paper of FIG. 4. This stream then is drawn upwardly through demister 58 on the back side of end plate 54 where a final vapor-liquid separation occurs. The resultant vapor stream then passes over the top edge 54a of the end plate and enters vapor duct 62a of the condenser. The distillate formed in the condenser then is collected for use or disposal, as desired.

The aperture 56 in the bottom of tray 52 is small enough that it does not significantly enter into the operation just described. Its purpose is to provide a drain for tray 52 so that when the evaporator is not in operation all liquid will drain down into the storage reservoir at the bottom of tank 50, thus satisfying the safety requirements of the radiation waste industry.

The continuous circulation of liquid from the storage reservoir to tray 52 by means of pump 59, and the continuous overflow of water from tray 52 back into the storage reservoir maintains a substantially uniform concentration of liquid throughout the operating apparatus. Of course this concentration will change as operation commences and continues, particularly when operating on a batch of given quantity.

Controls for maintaining stable operation of the apparatus of FIG. 4 have not been discussed since such apparatus and their use are known and are not the subject of the present invention.

As an example of an evaporator constructed in the manner illustrated in FIG. 4, the infeed flow rate through input port 42 was approximately 15 gallons per minute, the liquid flow rate provided by pump 59 was approximately 100 gallons per minute, and the liquid flow through apertures 27 and 27a was at a rate of approximately 4,500 gallons per minute. The heating tube bundle was approximately six feet long and was comprised of 145 U-tubes which provided a total heat transfer surface of approximately 280 square feet. Steam entered the heating tubes at a velocity of approximately 20,000 feet per minute. With regard to the two phase vapor-liquid stream which is generated in the shrouded tube bundle and passes through exit nozzle 33, vapor was generated at a rate of approximately 11,500 pounds per hour and the liquid circulation rate by way of the two phase stream was at a rate of approximately $2.3 \times 10^6$ pounds per hour.

What is claimed is:

1. A liquid evaporator for evaporating liquid comprising:

an elongated liquid container for containing a quantity of liquid to be evaporated, a heating tube bundle including a plurality of tubes disposed within said liquid container, said heating tube bundle being oriented horizontally, fluid impermeable fluid directing shroud means substantially enclosing said tube bundle, weir means for maintaining a desired liquid level in said liquid container about said fluid impermeable fluid directing shroud means, said weir means being located in said container outside of said fluid impermeable fluid directing shroud means, admitting means for admitting liquid from said liquid container into said fluid impermeable fluid directing shroud means at a desired rate, said admitting means and said weir means enabling the liquid level in said shroud means to be maintained below the liquid level in said liquid container outside of said shroud means and said tube bundle to be at least partially immersed in liquid, means for passing a heating fluid through the interiors of the tubes of said tube bundle to cause liquid within said fluid impermeable fluid directing shroud means to be formed into a high velocity vapor-liquid stream, exit nozzle means extending upwardly from the top of said fluid impermeable fluid directing shroud means, said exit nozzle means having converging means for directing said vapor-liquid stream from said fluid impermeable fluid directing shroud means, a stream diverting means above said exit nozzle means to direct liquid from said stream back into said quantity of liquid in said container, and withdrawing means for withdrawing the vapor of said stream from the region of the fluid impermeable fluid directing shroud means and the stream diverting means.

2. The liquid evaporator as set forth in claim 1 wherein said converging means forms a first opening means through which said vapor-liquid stream flows and forms in conjunction with said stream diverting means second opening means, said second opening means being slightly larger than said first opening means so as to restrict the flow of said vapor-liquid stream while directing the flow of said vapor-liquid stream.

3. The liquid evaporator as set forth in claim 2 wherein said second opening means includes two passageways, each of which is smaller than said first opening means.

4. A liquid evaporator comprising:

a liquid container for containing a quantity of liquid to be evaporated, first admitting means for admitting the liquid into said container, weir means for maintaining a desired liquid level in said container, a plurality of heating tubes forming a tube bundle and disposed within said container, shroud means substantially enclosing and disposed closely about said tube bundle, second admitting means for admitting liquid into said shroud means in said container at a desired rate to the interior of said shroud means such that the liquid in said shroud means at least partially immerses said heating tubes in said tube bundle and is below the level of liquid in said container, heating fluid means for passing a heating fluid through the interiors of the tubes of said tube bundle to cause liquid within said shroud means to be formed into a high velocity vapor-liquid stream that passes exteriorly through the tubes in said tube bundle, exit nozzle means associated with said shroud means for directing a vapor-liquid stream from said shroud means, a stream diverting means disposed relative to said exit nozzle means to direct liquid from said stream back into said quantity of liquid in said container, and means for withdrawing the vapor of said stream from the region of the shroud means and the stream diverting means.

5. A liquid evaporator as set forth in claim 4 wherein said exit nozzle means includes opposed converging structures so as to form a first opening means between said structures to restrict the flow of said stream and to direct said stream against said stream diverting means.

6. A boiling liquid evaporator comprising:

an elongated liquid container, said liquid container being a tray structure, an elongated heating tube bundle having a predetermined heat transfer capacity and disposed horizontally within said container, means for maintaining a desired liquid level in said container for at least partially immersing said tube bundle therein, fluid impermeable fluid directing means disposed about said tube bundle, means for admitting liquid into said fluid directing means including aperture means in the bottom portion of said fluid directing means for admitting liquid in the container at a desired rate to the interior of the fluid directing means, exit nozzle means at the top portion of the fluid directing means for directing a vapor-liquid stream from said fluid directing means, means for passing a heating fluid at a predetermined rate through the interiors of the tubes of said tube bundle to cause liquid within said directing means to violently boil and produce a high velocity vapor-liquid stream that passes exteriorly through a major portion of the tube bundle and through said nozzle means, stream diverting means disposed relative to said nozzle means to direct liquid from said stream outwardly and downwardly into said container, means for withdrawing the vapor of said stream from the regions of the fluid directing means and the stream diverting means, a tank for storing in the bottom portion thereof liquid to be evaporated, said elongated liquid container, said fluid directing means, said stream diverting means and said means for withdrawing vapor all being supported within said tank above the level of liquid stored therein, and means for supplying liquid from said tank to said liquid container in which the tube bundle is at least partially immersed.

7. The evaporator claimed in claim 6 and further including, means disposed within said tank for condensing the vapor withdrawn from said two phase stream, and means for withdrawing condensate from said tank.

* * * * *

UNITED STATES PATENT OFFICE
CERTIFICATE OF CORRECTION

Patent No. 4,167,437             Dated September 11, 1979

Inventor(s) FREDERICK W. GILBERT

It is certified that error appears in the above-identified patent and that said Letters Patent are hereby corrected as shown below:

Designated Assignee, first page, line [73], change

"Cook Electric Company, Morton Grove, Ill."

to -- Riley-Beaird, Inc., Chicago, Ill. --

Signed and Sealed this

Twelfth Day of February 1980

[SEAL]

Attest:

SIDNEY A. DIAMOND

Attesting Officer

Commissioner of Patents and Trademarks